United States Patent [19]
Duran

[11] Patent Number: 6,067,456
[45] Date of Patent: *May 23, 2000

[54] SYSTEM AND METHOD FOR RELOCATING A USER IN A COMMUNICATIONS NETWORK

[75] Inventor: Jose M. Duran, Paris, France

[73] Assignee: Northern Telecom Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/893,266

[22] Filed: Jul. 15, 1997

[51] Int. Cl.[7] .............................. H04Q 7/20; H04M 3/42
[52] U.S. Cl. ...................... 455/461; 455/414; 455/426; 379/207
[58] Field of Search ...................................... 455/414, 461, 455/413, 426, 432, 433, 428, 435, 450; 379/115, 207, 220, 229

[56] References Cited

U.S. PATENT DOCUMENTS

| | | | |
|---|---|---|---|
| 4,899,373 | 2/1990 | Lee et al. | 379/207 |
| 5,610,970 | 3/1997 | Fuller et al. | 455/418 |
| 5,758,281 | 5/1998 | Emery et al. | 455/428 |

*Primary Examiner*—Dwayne D. Bost
*Assistant Examiner*—Raymond B. Persino
*Attorney, Agent, or Firm*—Haynes & Boone, L.L.P.

[57] ABSTRACT

A system and method for temporarily relocating a subscriber in a cellular communications network to a new location such as another telephone. The subscriber enables the service by contacting a user interface system, which then instructs a home location network associated with the subscriber's home network and accessible through an intelligent network to provide appropriate information to the switch that is serving the new location. As a result, the subscriber may receive services that are identical, equivalent, or a subset of those that he receives from his home network.

24 Claims, 1 Drawing Sheet

SYSTEM AND METHOD FOR RELOCATING A USER IN A COMMUNICATIONS NETWORK

TECHNICAL FIELD

This invention relates generally to cellular communications networks, and in particular, to a system and method for temporarily transferring services from a first location to a second location.

BACKGROUND OF THE INVENTION

The expanse of communications networks has grown from the public switched telephone network ("PSTN") to include many different types of networks. For instance, cellular communications networks have grown in popularity such that in some areas, the number of mobile switching centers (MSCs) is approaching the number of land-line switches. In a cellular communications network, each MSC may serve a network of cell sites, or base stations, each of which defining a particular cell.

When a wireless unit such as a cellular telephone subscribes to a particular network of MSCs, the subscribed network maintains a profile for the wireless unit in a home location register ("HLR") database. The profile in the HLR includes account information such as subscribed services (e.g., call waiting or call forwarding) and account status (e.g., active or inactive). As a result, the wireless unit may roam, or visit, in many different MSCs or networks that have access to the HLR, thereby having access to the user's profile and account information. In addition to the HLR, each MSC also keeps track of visiting wireless units currently operating in its service area by maintaining a visitor location register ("VLR") database. The VLR contains information regarding the services available to each subscriber, the HLR which includes his profile, and the current status of the wireless unit.

When an in-coming call from an external network attempts to connect to a wireless unit, it first contacts an MSC of the wireless unit's subscribed network. The contacted MSC, using data from the HLR, instructs paging signals to be sent out in order to find the wireless unit. If the wireless unit responds, then a call is established. If the wireless unit does not respond, additional MSCs must be contacted in order to locate the wireless unit and establish connection.

On occasion, a user of the cellular network must temporarily relocate to a new location without using his own wireless unit. Consider for example the user of a fixed-access wireless unit. A fixed-access wireless unit is a device which has a base unit that supports wireless communications to and from a cell site, and a jack for receiving a cord from a conventional-type land-line telephone. In the present example, the user temporarily relocates to a new location which also has a fixed-access wireless unit. This new location may be serviced by the same cellular provider (e.g., Sprint, Omnipoint BellSouth or AT&T) as his subscribed network or in a completely different area accessible through a roaming agreement. It is often important for the user to be accessible for in-coming calls, as well as to have at his disposal certain subscribed services such as a long distance provider, voice mail, and/or call waiting. Although some switches, such as those in the PSTN, have systems in place to perform call forwarding for re-directing calls to another telephone, the functionality of call forwarding has many limitations. For one, call forwarding does not transfer all the services for which the user has subscribed. For another, accessing services at the original location can require different steps by the user. In continuance of the example, the new location has access to voice mail services provided at the users original location. However, instead of typing "*60" (for instance) to retrieve the messages like he usually does, the new location requires the user to enter "*72" to retrieve the messages. As a result, the user must learn how to access and use the services at the new location.

Therefore, what is needed is a system that can provide temporary subscriber relocation, including providing as many of the subscribers services as possible.

SUMMARY OF THE INVENTION

The foregoing problems are solved and a technical advance is to achieved by a system and method for temporarily relocating a subscriber in a cellular communications network to a new location such as another telephone. In one embodiment, the subscriber enables the service by contacting a user interface system. The user interface system instructs the HLR associated with the subscriber's home network and/or a signal control point ("SCP") accessible through an intelligent network to provide appropriate information to the switch that is serving the new location. As a result, the subscriber may receive services that are identical, equivalent, or a subset of those he receives from his home network.

An advantage of the present invention is that it supports subscribers who relocate temporarily by providing them with the services with which they are accustomed.

DESCRIPTION OF THE PREFERRED EMBODIMENT

Figure 1:
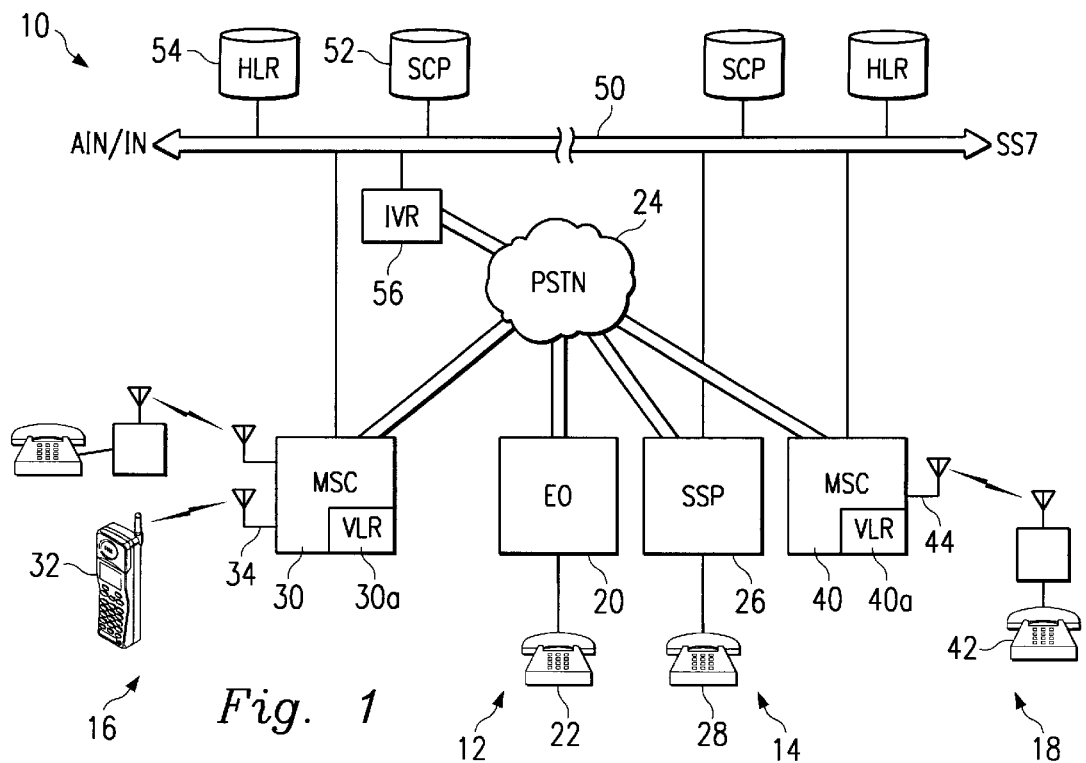
FIG. 1 illustrates an exemplary communication network.

Referring to FIG. 1, the reference numeral 10 designates a simplified communication network. The communication network 10 includes a first land-line network 12, a second land-line network 14, a first cellular network 16, and a second cellular network 18. The first land-line network 12 is graphically represented by an end office ("EO") 20 interconnecting a land-line telephone 22 with the PSTN 24. The second land-line network 14 is graphically represented by a service switching point ("SSP") 26 interconnecting a land-line telephone 28 with the PSTN 24. The first cellular network 16 is graphically represented by an MSC 30 interconnecting the PSTN 24 with a cellular telephone 32 through a cell site 34. Likewise, the second cellular network 18 is graphically represented by an MSC 40 interconnecting the PSTN 24 with a wireless fixed-access telephone 42 through a cell site 44. Associated with each of the MSCs 30, 40 are VLRs 30a, 40a, respectively.

Since all of the switches 20, 26, 30, 40 are physically connected to the PSTN 24, any combination of calls may be completed between the land-line telephones 22, 28 and the cellular telephones 32, 42. The MSCs 30, 40 and the SSP 26 are also connected to an intelligent network ("IN") 50. The IN 50 uses a conventional signaling protocol such as Signaling System 7 ("SS7") and is capable of accessing data from a SCP 52 and an HLR 54 associated with the cellular network 16. The IN 50 is representative of various types of networks, including advanced intelligent networks ("AIN"), and may be conventionally used for various purposes, including facilitating roaming of the cellular telephone 32 between the two cellular networks 16 and 18.

Also connected to the PSTN 24 is an interactive voice response ("IVR") 56. The IVR 56 is accessible through the PSTN by a toll-free number and is capable of interfacing with a caller, receiving information including a telephone number of the new location from the caller, which can be done automatically such as through an automatic number identification ("ANI") or manually by requiring the caller to physically enter the number of the new location, and transferring the information to the HLR 54 and/or SCP 52. The IVR 56 is representative of many different types of user interfaces, some of which may be incorporated into the MSC 30 while still providing the same basic functionality as described below.

Figure 2:
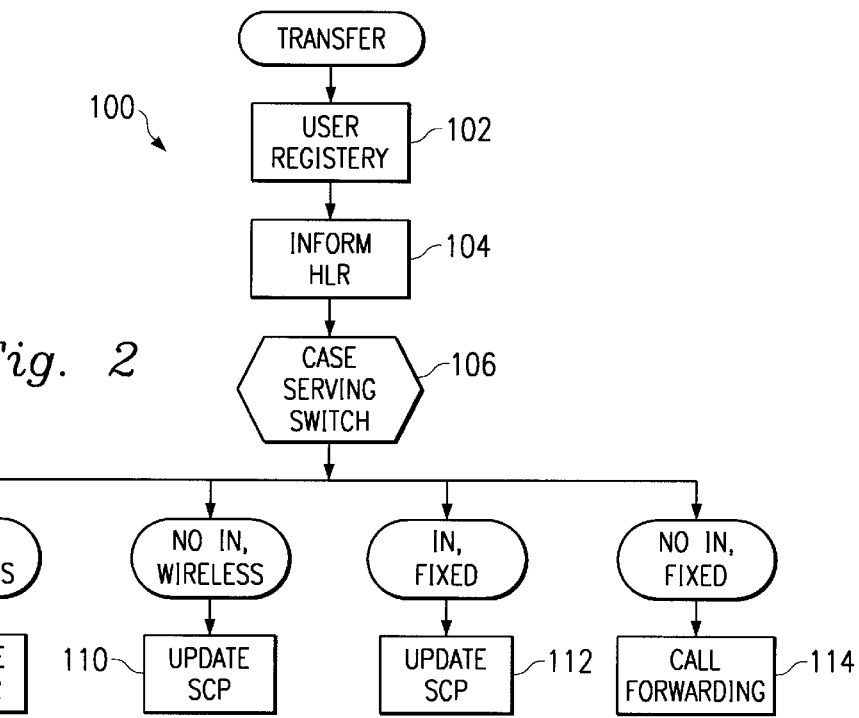
FIG. 2 is a flowchart illustrating a routine for transferring subscriber services to a new location in the communication network of FIG. 1.

Referring to FIG. 2, a routine 100 is used to temporarily relocate a subscriber of a cellular communications network to another telephone. For the sake of example, the routine will temporarily relocate the user of cellular telephone 32 to another, preexisting dialed number ("DN") telephone, such as one of the other three telephones 22, 28, or 42, all of FIG. 1. In this example, the user of cellular telephone 32 subscribes to the cellular network 16.

At step 102, the user registers his new location by calling the IVR 56. The IVR 56 receives the new location from the user, along with an amount of time that the user plans to be at the new location. Alternatively, there may be a default amount of time for which the services will be relocated. At step 104 the IVR 56 informs the HLR (HLR 54) associated with the user's home network (cellular network 16) to notify the HLR that the user is in the new location and that he wishes to receive service at the new location. At step 106, the type of service now available to the user depends upon the type switch serving the new location (serving switch).

For the case in which the serving switch is a wireless switch (MSC 40) and has access to the HLR (via the IN 50), execution advances to step 108. For this case, the serving switch (MSC 40) either has the same cellular provider as the home network (cellular network 16) or has a roaming agreement with the home network. At step 108, the HLR (HLR 54) sends a user profile to the serving switch's VLR (VLR 40a). Therefore, the serving switch's VLR (VLR 40a) contains two entries: one for the original user of the new location (wireless fixed-access telephone 42) and one for the user who has just relocated (cellular telephone 32). As a result, the user at the new location (wireless fixed-access telephone 42) will have the same services that he is accustomed to using.

For the case in which the serving switch is a wireless switch (MSC 40) that does not have access to the user's HLR (MSC 40 cannot access HLR 54), execution advances to step 110. For this case, the serving MSC (MSC 40) neither has the same cellular provider as the home network (cellular network 16) nor has a roaming agreement with the home network. At step 110, the HLR (HLR 54) performs conventional call forwarding functions to the new location (cellular telephone 42). In addition, it is possible, depending on the roaming agreement between the home network (cellular network 16) and the serving MSC (MSC 40) and the appropriate technology (e.g., MAP-ISSI inter-working), to provide addition services from the user's service profile.

For the case in which the serving switch is a fixed switch (SSP 26) and has access to the HLR (via the IN 50), execution advances to step 112. At step 112, an SCP (SCP 52) updates the HLR (HLR 54) with the user's new location. First of all, the HLR (HLR 54) performs conventional call forwarding functions. Secondly, certain functionalities may be performed using intelligent network capabilities. For example, when the user originates a call from the new location (telephone 28), the serving switch (SSP 26) notifies the SCP (SCP 52). The SCP (SCP 52) knows that the user is temporarily located at the new location and uses information from the user's HLR (HLR 54) to provide services with which the user is accustomed.

For the case in which the serving switch is a fixed switch (EO 20) and does not have access to the user's HLR (EO 20 cannot access HLR 54), execution advances to step 114. At step 114, the HLR (HLR 54) performs conventional call forwarding functions to the new location (telephone 22).

The above cases are summarized in Table 1, as described below:

TABLE 1

| The New Location is: | Transferred Services Include: |
| --- | --- |
| a wired unit connected to a fixed switch which has access to the user's profile (e.g., via the IN 50). | forwarded incoming calls, user's long distance provider, calling name and number delivery, and bill delivery. The original DN for the new location retains its original services. |
| a wired unit connected to a fixed switch which does not have access to the user's profile. | forwarded incoming calls. The original DN for the new location retains its original services. |
| wireless fixed-access unit connected to the user's home network. | the exact same services as in the home location. |
| wireless fixed-access unit connected to a different network. | potentially the exact same services as in the home location, depending on the services available at the new location, the roaming agreements between the two networks, and given appropriate technology. |

In an alternative embodiment, the above routine can be achieved by moving an identification device from the home location to the new location. For example, if the user has a wireless fixed-access telephone at his home location, he may remove a circuit card, such as a single in-line memory module ("SIMM"), that identifies his profile on the HLR. When he reaches the new location, which also has a wireless fixed-access telephone, he may replace or add the circuit card from the telephone at the home location to the telephone at the new location. As a result, the replaced or added card may notify the home network of the user's relocation and transport the services accordingly, thereby providing the temporary number services portability for cellular subscribers.

Although illustrative embodiments of the invention have been shown and described, other modifications, changes, and substitutions are intended in the foregoing disclosure. For example, the new location may use a secondary distinctive ring to distinguish calls to the new user from calls to the original DN. Furthermore, the above described embodiment can be easily implemented in the SSP 26 or other switches of the communications network 10, thereby providing a uniform method for relocating users. Accordingly, it is appropriate that the appended claims be construed broadly and in a manner consistent with the scope of the invention.

What is claimed is:

1. A method for relocating a user subscribed to a cellular network having a home location register, to a fixed-access telephone in a second network, the second network having access to the register through an intelligent network, the method comprising the steps of:

maintaining a profile of the user in the register, the profile describing at least one service available to the user for making outbound calls while in the cellular network;

receiving notification in the cellular network from the user of a desire to relocate to the fixed-access telephone;

receiving a number in the cellular network for the fixed-access telephone;

copying a portion of the profile to a switch in the second network, the portion specifying one or more services subscribed to by the wireless unit; and providing the subscribed services specified in the portion of the profile to the fixed-access telephone;

whereby the user may make outbound calls from the fixed-access telephone according to the profile maintained in the cellular network.

2. The method of claim 1 further comprising receiving an amount of time for which the user should be relocated.

3. The method of claim 1 wherein the user is relocated for a predetermined amount of time.

4. A method for relocating a wireless unit from a first location in a first wireless network to a second location in a second network, wherein the first wireless network provides a first set of outgoing call-related services for the wireless unit in the first location and the second network provides a second set of services for the second location, the method comprising the steps of:

maintaining a profile of the first set of services in a central database;

receiving notification in the first wireless network from the first user of the second location;

copying a portion of the profile to a switch that services the second location, the portion specifying the first set of services; and providing the first set of services specified in the portion of the profile to the second location;

wherein the second location provides both the first and second sets of services to the new location and wherein the first set of services is different from the second set of services.

5. The method of claim 4 wherein the switch is a mobile switch of the second network and the second network is a wireless network.

6. The method of claim 4 wherein the switch is a mobile switch of a second network, the second network is a wireless network which has direct access to the profile and wherein the first set of services are all the outgoing call-related services to which the wireless unit subscribes that are available on the second wireless network.

7. The method of claim 4 wherein the central database is a home location register.

8. The method of claim 4 wherein the central database is a signal control point.

9. The method of claim 4 wherein the switch accesses the central database through an intelligent network.

10. The method of claim 4 wherein the notification of the new location is received by receiving a dialed number from the user at the new location.

11. The method of claim 4 wherein the switch is a service switching point connected to the central database through an intelligent network.

12. The method of claim 4 wherein the switch and the central database are in a single cellular network and the services provided at the new location are the same as those provided at a home location.

13. A system for relocating a wireless user on a first device at an old location in a wireless network to a second device at a new location in which a second user is being serviced, the system comprising:

means for accessing a central database containing a profile for the wireless user;

a node of the wireless network for receiving notification from the wireless user of the new location; and means for providing a portion of the profile to a switch that services the new location so that the switch may provide incoming and outgoing call services to the new location according to the profile while maintaining the same services to the second user.

14. The system of claim 13 wherein the switch is a mobile switch of the wireless network and wherein the services are a subset of the services to which the wireless user subscribes.

15. The system of claim 13 wherein the services include at least one of either call waiting or voice mail.

16. The system of claim 13 wherein the central database is a home location register.

17. The system of claim 13 wherein the central database is a signal control point.

18. The system of claim 13 wherein the means for accessing the central database is an intelligent network.

19. The system of claim 13 wherein the means for receiving notification is a user interface system that allows the wireless user to dial in from the new location and then automatically determines the new location from the dialed number.

20. The system of claim 13 wherein the means for receiving notification is a user interface system that allows the wireless user to manually provide a number for the new location.

21. The system of claim 13 wherein the switch is part of a wireless network.

22. The system of claim 13 wherein the switch is a service switching point connected to the central database through an intelligent network.

23. The system of claim 13 wherein the switch and the central database are in a single cellular network and the services provided at the new location are the same as those provided at a home location.

24. The system of claim 13 wherein the switch is a land-line switch connected to the central database through an intelligent network.

* * * * *